United States Patent
Collins et al.

(10) Patent No.: US 11,993,748 B2
(45) Date of Patent: May 28, 2024

(54) TAGGING OF FRACKING SAND

(71) Applicant: Intelligent Material Solutions, Inc., Princeton, NJ (US)

(72) Inventors: Joshua E. Collins, Wallingford, PA (US); Howard Y. Bell, Princeton, NJ (US)

(73) Assignee: INTELLIGENT MATERIAL SOLUTIONS, INC., Princeton, NJ (US)

( * ) Notice: Subject to any disclaimer, the term of this patent is extended or adjusted under 35 U.S.C. 154(b) by 355 days.

(21) Appl. No.: 17/258,532

(22) PCT Filed: Jul. 10, 2019

(86) PCT No.: PCT/US2019/041115
§ 371 (c)(1),
(2) Date: Jan. 7, 2021

(87) PCT Pub. No.: WO2020/014300
PCT Pub. Date: Jan. 16, 2020

(65) Prior Publication Data
US 2021/0230477 A1    Jul. 29, 2021

Related U.S. Application Data (60) Provisional application No. 62/697,003, filed on Jul. 12, 2018.

(51) Int. Cl.
C09K 8/80    (2006.01)
C09D 7/40    (2018.01)
(Continued)

(52) U.S. Cl.
CPC ............... *C09K 8/805* (2013.01); *C09D 7/62* (2018.01); *C09D 7/67* (2018.01); *C09D 133/02* (2013.01);
(Continued)

(58) Field of Classification Search
None
See application file for complete search history.

(56) References Cited

U.S. PATENT DOCUMENTS

| | | |
|---|---|---|
| 3,608,975 A | 9/1971 | Sawyer et al. |
| 7,334,635 B2 | 2/2008 | Nguyen |

(Continued)

FOREIGN PATENT DOCUMENTS

| | | |
|---|---|---|
| EP | 1607572 A1 | 12/2005 |
| WO | 2002012674 A1 | 2/2002 |
| WO | 2014021119 A1 | 2/2014 |

OTHER PUBLICATIONS

International Search Report and Written Opinion for PCT/US2019/041115, dated Sep. 13, 2019.

*Primary Examiner* — John J Figueroa
(74) *Attorney, Agent, or Firm* — MEAGHER EMANUEL LAKS GOLDBERG & LIAO, LLP (57) ABSTRACT

Disclosed is a process for on- and off-site tagging of fracking sand and a composition of matter capable of being utilized in that process. The composition of matter includes a linker polymer conjugated to a rare earth particle. The method involves forming two mixtures, a first involving mixing a linker polymer conjugated to a rare earth particle into an aqueous blend of fracking sand, and a second involving an activated amine terminated polymer in an aqueous solution. The second mixture is then added to the first mixture, and covalent amide bonds are formed.

3 Claims, 8 Drawing Sheets

(51) Int. Cl.
  *C09D 7/62* (2018.01)
  *C09D 133/02* (2006.01)
  *C09D 165/00* (2006.01)
  *C09D 167/08* (2006.01)
  *C09D 179/02* (2006.01)
  *C09D 187/00* (2006.01)

(52) U.S. Cl.
  CPC ......... *C09D 165/00* (2013.01); *C09D 167/08* (2013.01); *C09D 179/02* (2013.01); *C09D 187/00* (2013.01)

(56) References Cited

U.S. PATENT DOCUMENTS

| | | | |
|---|---|---|---|
| 8,354,279 | B2 | 1/2013 | Nguyen et al. |
| 8,607,395 | B2 | 12/2013 | Karasek |
| 8,613,320 | B2 | 12/2013 | Nguyen et al. |
| 9,097,077 | B2 | 8/2015 | Williamson |
| 9,181,477 | B2 | 11/2015 | Collins et al. |
| 9,555,132 | B2 | 1/2017 | Vinogradov et al. |
| 9,580,637 | B2 * | 2/2017 | Gordon ................. C09K 8/035 |
| 9,868,896 | B2 | 1/2018 | Mahoney et al. |
| 2001/0036667 | A1 * | 11/2001 | Tayebi ................... G01V 9/007 436/56 |
| 2007/0105094 | A1 | 5/2007 | Fujita et al. |
| 2014/0196894 | A1 * | 7/2014 | Berkland ............... C09K 8/887 507/225 |
| 2015/0096751 | A1 * | 4/2015 | Shen ....................... C09K 8/92 507/224 |
| 2015/0119301 | A1 * | 4/2015 | McDaniel ............. E21B 43/267 507/224 |
| 2015/0192518 | A1 | 7/2015 | Baxter et al. |
| 2015/0353817 | A1 * | 12/2015 | Kersey .................. C09K 8/805 166/243 |
| 2016/0137904 | A1 * | 5/2016 | Drake ................... C09K 8/536 507/219 |
| 2016/0230543 | A1 * | 8/2016 | Borrell .................... C09K 8/80 |
| 2017/0015896 | A1 * | 1/2017 | Cox ........................ C09K 8/588 |
| 2018/0002594 | A1 | 1/2018 | Hu et al. |
| 2018/0087369 | A1 * | 3/2018 | Sherman ................ G01N 33/24 |
| 2018/0128096 | A1 * | 5/2018 | Cox ..................... G01N 30/7206 |
| 2018/0171782 | A1 * | 6/2018 | Cox ........................ E21B 47/11 |

\* cited by examiner

TAGGING OF FRACKING SAND

CROSS-REFERENCE TO RELATED APPLICATIONS

This application claims priority to U.S. Provisional Application No. 62/697,003, filed on Jul. 12, 2018, which is hereby incorporated by reference in its entirety.

TECHNICAL FIELD

This invention relates generally to the recovery of hydrocarbons from a subterranean formation penetrated by a well bore and more particularly to phosphor compositions and methods of utilizing phosphor compositions for determining the source of treatment fluids being produced from a production formation having multiple zones.

BACKGROUND

The increased role of natural gas as a non-renewable energy source and in particular its extraction method of hydraulic fracking has heightened the concerns of public and environmental health risks resulting from ground water contamination. The various chemicals used in fracturing fluids such as benzene, aromatic hydrocarbons, formaldehyde, hydrochloric acid, among others possess extreme public health hazards if the hydraulic fluids have the potential to enter the groundwater aquifers intended for public use.

In general, fracking is the process of drilling down into the earth and injecting a mixture of water, sand, and chemicals into the rock at high pressure in order to release the oil or gas inside, which allows the oil or gas to flow back out to the head of the well.

The state of the art in hydraulic fracking may generally be found in the disclosures of the following patents or published applications: U.S. Pat. No. 8,354,279; EP 1,607,572; U.S. Pat. No. 9,097,077; WO 2002/012674A1; U.S. Pat. Nos. 8,613,320; 7,334,635; and 8,607,395. The disclosures of which are all incorporated herein by reference. These patents and published applications describe methods and materials used to recover hydrocarbons from subterranean formations, including oil wells; and methods of delivering particulate materials into such formations.

To date, no on-site method has been developed that allows tracking of the transport of materials introduced to or produced from a subterranean formation or zone during the production of hydrocarbons from a subterranean formation penetrated by a well bore.

BRIEF SUMMARY

A first aspect of the present disclosure is drawn to a method for tagging of fracking sand. The method includes forming a first mixture of carboxylated acid-coated particles in an aqueous blend of fracking sand, where each carboxylated acid-coated particle has a linker polymer conjugated to a rare earth particle. A second mixture is also formed, by dissolving an activated amine terminated polymer in an aqueous solution at a concentration based upon the amount of carboxylated acid-coated particles in the first mixture. The second mixture is added to the first mixture at a flow rate based on rare earth particle concentration, fracking sand concentration, activated amine terminated polymer concentration, or a combination thereof. A covalent amide bond is then formed by allowing the at least one activated amine terminated polymer to react to the carboxylic acid-coated rare earth particle.

In certain embodiments, the activated amine terminated polymer may be poly(ethyleneimine) or a linear or branched polymer. In certain embodiments, the linker polymer may be a linear or branched polymer, and in particular embodiments, may be a dendrimer, a naphthalene-based polymer, myristic acid, lactic acid, or a hydrocarbon resin. In some embodiments, the linker polymer may be poly(acrylic acid) (PAA). In certain embodiments, the linker polymer may be conjugated via direct absorption or covalent linkage.

A second aspect of the present disclosure is drawn to a composition of matter for use in tagging fracking sand. The composition includes a linker polymer conjugated to a rare earth particle. In some embodiments, the linker polymer comprises a linear or branched polymer, and in particular embodiments, may be a dendrimer, a naphthalene-based polymer, myristic acid, or a hydrocarbon resin.

A third aspect of the present disclosure is drawn to mixtures incorporating the above-referenced composition. Specifically, the mixtures include the above-referenced composition of matter—a linker polymer conjugated to a rare earth particle—where the composition of matter has formed a covalent amide bond to at least one amine terminated polymer. The covalently bound particle is suspended in a refined hydrocarbon (e.g., gasoline, lubricant, etc.).

DETAILED DESCRIPTION

The disclosed method allows tracking of the transport of materials introduced to or produced from a subterranean formation or zone during the production of hydrocarbons from a subterranean formation penetrated by a well bore.

Disclosed is a technology for on-site or off-site tagging of proppant sand in an aqueous or other liquid-based environment. The sand tagging system allows for rapid (<10 min.), large-scale tagging of proppant, typically sand, using a two-part tagging solution that initiates covalent bonding and cross-linking of rare earth particles to the surface of the proppant sand grains.

According to one embodiment, to determine from which zone(s) used material comes from, a material or fluid should be introduced and/or produced that incorporates a rare earth crystalline phosphor composition in the base treatment fluid as the fluid is being pumped downhole during the treatment.

Figure 1A:
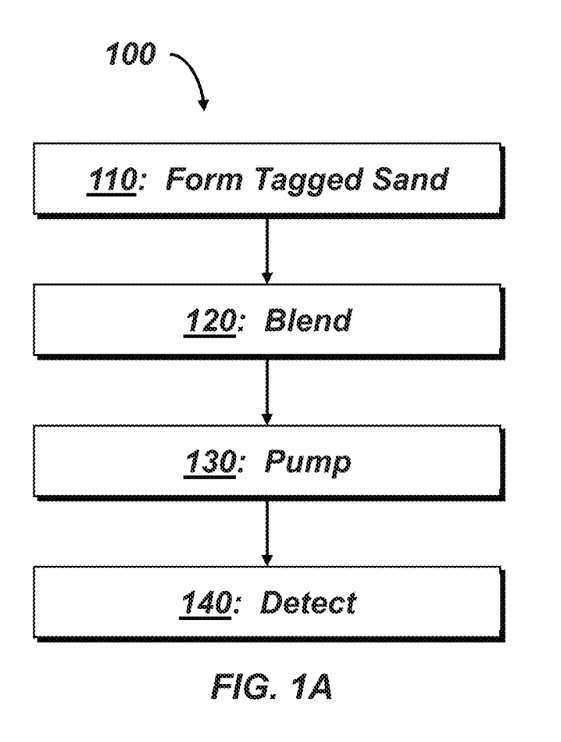
FIG. 1A is a flowchart of an embodiment of a disclosed method.

As seen in reference to FIGS. 1A and 1, such a method (100) for tracking materials used during the fracking process can generally be broken into several stages. Referring to FIG. 1A, the first step involves forming tagged sand (110).

Figure 1B:
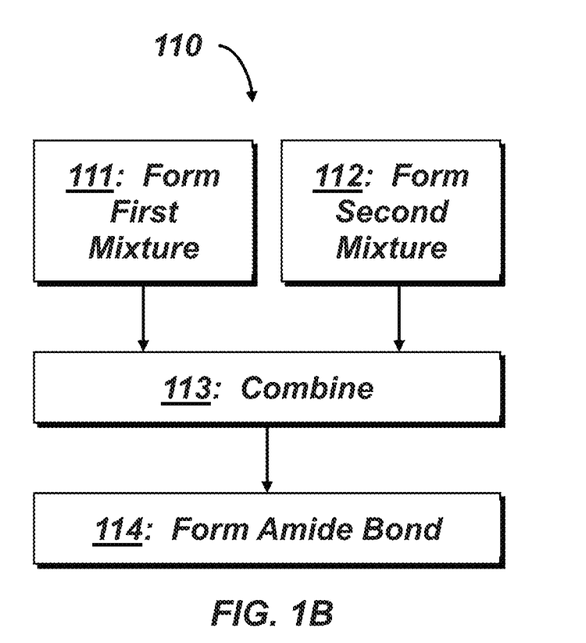
FIG. 1B is a flowchart of an embodiment of the first step of a disclosed method.

Referring to FIG. 1B, the formation of tagged sand (110) typically involves four steps. The first step involves forming a first mixture (111) by mixing amine-reactive coated particles (e.g., carboxylated acid-coated particles) in an aqueous blend of fracking sand. This can be done in any appropriate mixing vessel, although in some embodiments, this mixing occurs in a mobile blending unit in the geographic vicinity (for example, within 5 miles, more preferably within 1 mile, and still more preferably within 0.5 miles of a well bore. In certain embodiments, the mixing vessel has been modified to allow for in-line spectroscopic analysis of rare earth particle mixtures. For example, this may include adding ports through which a multispectral analyzer can be used, or by running piping from the bottom of the mixing vessel to the top, and having a spectrometer measuring the recirculated fluid as it exits the piping and before it enters the mixing vessel.

While there are no limitations on the ratio of particles to proppant, certain embodiments use ratios of 0.1 pg to 10 g of carboxylated acid-coated particles per 1 kg of proppant.

At this stage, the first mixture will typically consist of amine-reactive coated particles intermixed substantially homogeneously in the aqueous solution with the proppant.

Each amine-reactive coated particle may comprise or consist of a linker polymer conjugated to a rare earth particle. As used herein, these coated particles having a diameter of less than about 100 nm are sometimes referred to as "nanoparticles."

Rare Earth Particle

Any rare earth phosphor or chelate may generally be used as a rare earth particle. The rare earth particle will act as a tracer within the subterranean formation. Singular types of phosphors may be used, or particular combinations of phosphors may be used to identify different fluids, sources (e.g. wells), subterranean zones or formations. Different combinations of phosphors produce a fingerprint that may identify the unique starting material or location and allow tracking. The crystals can be blended, mixed, coated, suspended into various ingredients. The surface chemistry of the crystals can be modified to be suspended into any polar and nonpolar solutions.

Preferably, the rare earth particles are crystal phosphors that possess unique optical properties that can be detected at parts per billion levels, using one or more devices selected from a suite of field deployable/handheld and benchtop detection platforms capable of rapid identification of multiple optical signatures simultaneously.

Preferably, the crystal optical and magnetic properties of the rare earth particles are highly tunable. In this way, the disclosed approach provides trillions of combinations of opto-magnetic rare earth particles, which allows one of skill in the art to create a unique optical code that can be used to mark any or all of the components used in hydraulic fracturing fluids. For example, in addition to marking and identification of each hydraulic fluid component, the fracturing fluid blenders can be labeled and individual wells for oil and gas can be marked each with a unique optical signature.

These rare earth phosphors or chelates may be incorporated into treatment fluids including, but not limited to fracturing fluids, drilling fluids, disposal fluids and injection fluids used as displacement fluids in hydrocarbon recovery processes. Acting as a fluid tracer agent, a phosphor or combination of phosphors can be "tagged" into the injection fluid, such that the phosphor or combination of phosphors is unique for each treatment job such as a fracturing job treatment. For example, given 8 different phosphors, up to 36 different treatment jobs can be uniquely identified if 1 or 2 different phosphors are used for each job ($_8C_1+_8C_2=8+28=36$).

In another embodiment, a rare earth particle may be incorporated into or combined with other production materials used in hydrocarbon production as well as products and by-products, such as fracking sand, water, oil, crude, liquefied gas, foaming agents, chelating agents, liquid breaker acids, breakers, biocides, polymer slurries, corrosion inhibitors, salts (e.g. sodium or potassium chloride), borate crosslinkers, gelling agents, waste water ponds, ethylene glycol, polyacrylamide, etc. That is, the rare earth particle may generally be incorporated with any material used or introduced downhole, any product, or any by-product which it may necessary to track to its origin or to follow its flow before, during or after production.

The disclosed rare earth particles are inert, non-toxic materials which can be modified with a variety of surface chemistries to match the solubility of the fluid component that the crystals will be introduced ensuring stability of the crystal particles in the slurry.

Potential crystal host compositions of rare earth particles can include but are not limited to halides such as $NaYF_4$, $LiYF_4$, $BaYF_5$, $NaGdF_4$, $KYF_4$, oxides such as $Y_2O_3$, $Gd_2O_3$, $La_2O_3$, oxysulfides such as $Y_2O_2S$, $Gd_2O_2S$, $La_2O_2S$. A selection of rare earth dopants can then be incorporated into the host lattice at varying concentrations. Single or multiple dopants can be incorporated into the host lattice giving rise to a unique optical property that can be readily measured using a paired optical detection device. Examples of dopant(s) and combinations are; YbEr, YbTm, YbHo, Er alone, Yb alone, Tm alone, NdTm, NdTmYb. The dopants can be incorporated into the host lattice anywhere from 0.02%-90% total rare earth doping concentration. For example, one composition could be $NaYF_4$:Yb(0.7),Tm (0.02) with Yttrium (Y) comprising ~18% of the total rare earths, Ytterbium (Yb) 70%, and Thulium (Tm), 2%, which yields a 72% total rare earth doping concentration. The particle size range of these rare earth particles are optimally below 1 micron, allowing for a more stable suspension in the proppant solution. Additionally, uniformity in size and morphologies will limit agglomeration and settling.

These rare earth particles can be further combined with various inorganic materials (e.g., gold and silver nanoparticles) and organic markers (e.g., rare earth chelates, Pd/Pt porphyrin dyes) markers that can be conjugated to the crystal surface providing, e.g., either enhanced plasmonic emissions or Fluorescence resonance energy transfer (FRET)/Luminescence resonance energy transfer (LRET) energy transfer conversions in order to, e.g., increase sensitivity and/or improve multiplexed detection capabilities.

Preferred rare earth particles have an extremely efficient and pure beta phase, crystalline structures with tunable morphologies, with particle sizes and optical properties that are substantially identical particle to particle. Such intersystem uniformity enables even single particle detection and very sensitive quantification capabilities due to the low signal to noise from the tunable spectral and lifetime properties as well as signal purity within the particle systems.

Suitable rare earth particles include the morphologically and size uniform, monodisperse phosphor particles described in U.S. Pat. No. 9,181,477 B2, which is incorporated herein in its entirety.

Linker Polymer

Generally, any polymer used for linker chemistry that is known to those of skill in the art may be utilized, provide it is reactive with amines. In preferred embodiments, the linker polymer comprises a linear or branched polymer. In more preferred embodiments, the linker polymer is a dendrimer, a naphthalene-based polymer, myristic acid, a hydrocarbon resin, or poly(acrylic acid) (PAA).

Other linker chemistry known to those of skill in the art can be used, including but not limited to: homofunctional and heterofunctional linkers and crosslinkers with a variety of functional groups, such as primary amines, sulfhydryls, acids, alcohols. The linker polymer may be conjugated via direct absorption or covalent linkage. Crosslinkers may be functionalized with, e.g., maleimide and succinimidyl ester (NHS) or isothiocyanate (ITC) groups that are reactive with amines. The ideal linker chemistries will be stable in both non-aromatic (aliphatic) and aromatic compounds typically observed in hydrocarbon compositions.

Some embodiments utilize materials already utilized in the fracking process as linker polymers. For example, undoped naphthalene resin coatings are commercially widely available and utilized on proppant sand for better flow control during the fracking stages. Thus, an example of off-site proppant tagging involves combining proppant sand, rare earth particles, and a naphthalene liquid polymer to create a rare earth particle doped resin coating over the proppant sand.

Referring back to FIG. 1B, at some point before, during, or after the first mixture is formed, a second mixture is formed (112). The second mixture is generally formed by dissolving at least one activated amine terminated polymer in an aqueous solution at a concentration based upon the amount of amine-reactive coated particles present, or expected to be present, in the first mixture, typically on or around the stoichiometric quantities required.

In some embodiments, the activated amine terminated polymer comprises poly(ethyleneimine). In some embodiments, the activated amine terminated polymer comprises a linear or branched polymer.

In some embodiments, the first and second mixtures can be made on-site. In some embodiments, the first, second, or both are made off-site.

The first and second mixture are then combined (113). The second mixture should be added to the first mixture at a flow rate that is based on the concentration of rare earth particles, the concentration of fracking sand, the concentration of activated amine terminated polymers, or some combination thereof.

Then, a covalent amide bond may be formed (114) by allowing an amine terminated polymer to react with the amine-reactive coated particle. The amine-terminated polymer will also bind or otherwise attach to the surface of the proppant, thereby "tagging" the proppant. Some may also remain unbound or unattached, simply mixed into the aqueous solution. At this point the mixing vessel should have the proppant attached to one or more of the newly formed taggants, where the amine-terminated polymer is bound to the linker polymer, which in turn is conjugated to the rear earth particle.

Figure 2A:
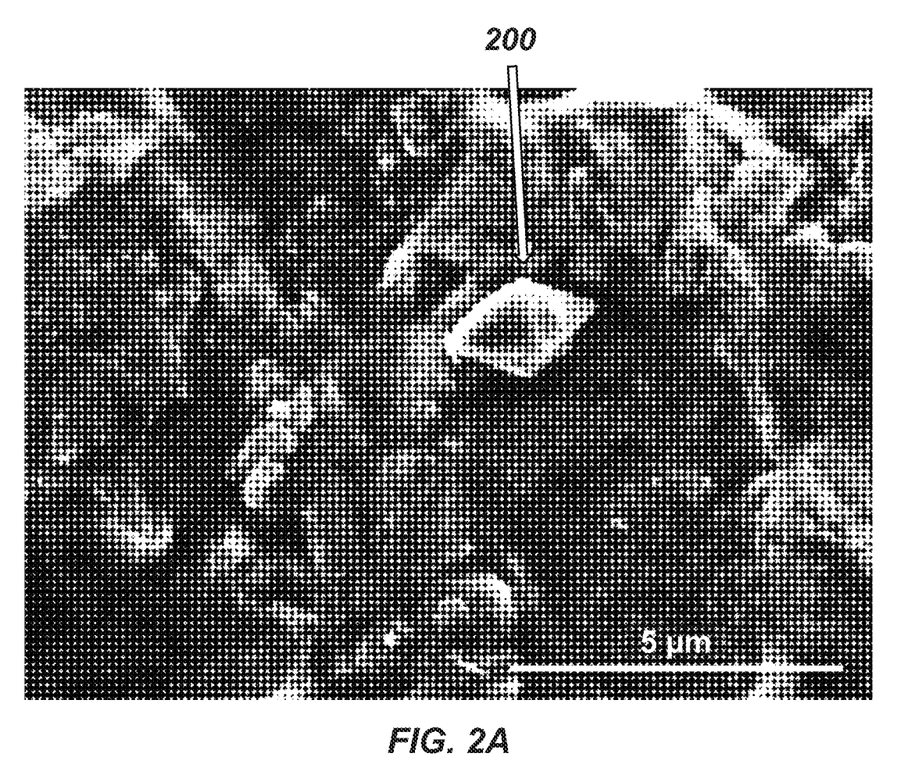
FIGS. 2A and 2B are SEM images of sand tagged using the disclosed method.
Figure 2B:
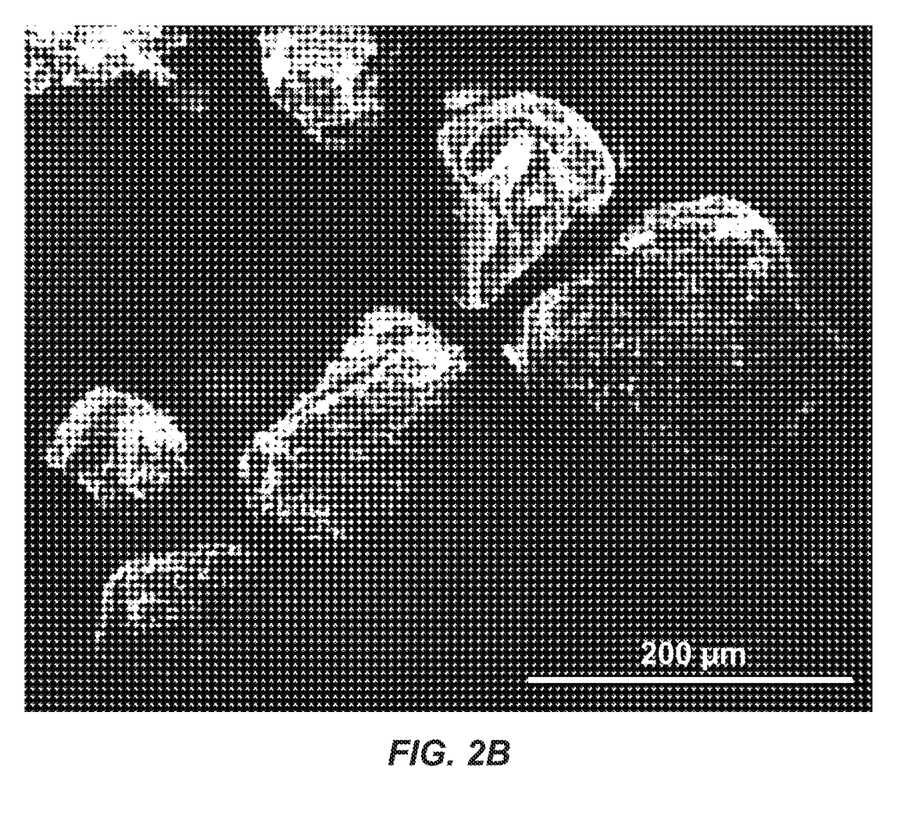

Referring to FIGS. 2A and 2B, SEM images of rare earth particles covalently bound to the surface of proppant sand are seen. FIG. 2A shows an SEM image of a micro-diamond particle (200) covalently linked to the surface of a sand particle. As seen in FIG. 2B, there is no free particle seen, highlighting complete linkage of all particles to the surface of the sand grains.

Figure 3:
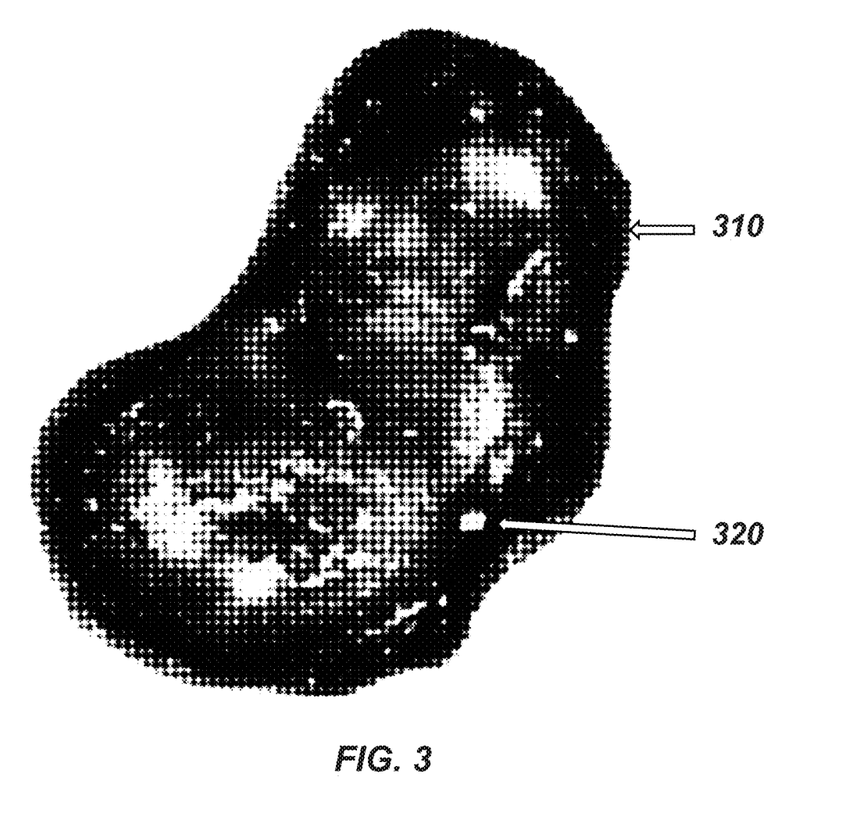
FIG. 3 is an upconversion image of a sand particle tagged using a naphthalene resin as a linker polymer.

Referring to FIG. 3, an upconversion image of a proppant tagged using a naphthalene resin as the linker polymer. In the image, the darker areas (310) are the proppant, while the lighter images (320) indicate the rare earth particles emitting at the two primary emission peaks from the taggant (540 nm and 660 nm).

Example 1

In one example, about 1 mg of PAA-modified $NaYF_4$:Yb,Er nanoparticles, which had average particle diameters of approximately 200 nm, were dispersed in an aqueous suspension containing approximately 10 g of proppant sand. The aqueous suspension of proppant and PAA-modified $NaYF_4$:Yb,Er nanoparticles were briefly mixed (less than 1 minute) until a uniform suspension was formed. Then, approximately 100 μL of a solution containing approximately 1:1 weight ratio of PEI (polyethylenimine) and water, is added into the proppant/PAA-$NaYF_4$:Yb,Er mixture. The addition of the PEI induces immediate cross-linking via ionic coupling or neutralization between the PEI, the PAA-modified nanoparticles, and the proppant sand. The tagged proppant can be subsequently injected down a wellbore.

Example 2

Another example utilizes a naphthalene resin-based coating as the linker chemistry to the surface of the proppant sand. Samples of hydrocarbon resin coated proppant were prepared incorporating $LiYF_4$:Yb,Er micro-crystal reporters into the initial resin prior to coating of the proppant.

In one example, approximately 5 g of myristic acid modified $NaYF_4$:Yb(0.2),Er(0.02) nanoparticles were dispersed in 20 mL of hexane then sonicated and vortexed briefly forming a suspension. The nanoparticle suspension was then added to approximately 100 mL of Hexion Prop-Shield™ (#5219) proppant flowback control additive (a naphthalene-based resin) and stirred vigorously at 60° C. overnight. The resultant mixture is ready for coating of proppant sand. The proppant can be coated by various methods.

One such coating method utilizes a Pneumatic Based Sand Coating System. The proppant can be either pre-coated in a production facility and taken to location or at the well site using liquid resin coating systems. The resin coat can be pre-cured or curable. Pre-cured resin coated sand is manufactured by applying or "coating" the resin on to proppant sand. For curable resin-coated proppant, the proppant is pumped downhole then followed by a cross-linking solution which surrounds the proppant grains resulting in a consolidated proppant bed.

In another embodiment utilizing pre-cured resins, the proppant sand may be coated by taking totes of uncoated proppant and feeding the proppant into a pneumatically controlled transporter which sends the proppant into Fill Coating and Header Feeders to ensure a monodisperse proppant mixture. The various headers and feeders are designed to reduce dust as well as ensure uniform coating of the resin on the proppant. To do this the typical fracking sand plant utilizes wet processes including Wet Screening, Washing, Attrition Scrubbing, Hydraulic Classification and Dewatering. It is in this stage that the resin coating is applied to the proppant. The proppant then is sent to the Coating Feeder which sprays a thin layer of the proppant resin containing rare earth micro-crystals onto the proppant sand.

The wet plant processing is then followed by the drying stages which include removal of water, dry screening/curing, and storage.

Referring back to FIG. 1A, the method (100) continues by moving (via pumping, pouring, etc.) the tagged proppant to, e.g., a blender, and blending the tagged proppant and additional untagged proppant together (120).

The blended proppant can then be pumped (130) to an injection site/well head.

Include both in-line and off-line detection methods

In-line detection (140) may optionally occur at injection control sites and/or at exchange points between blenders. This information gleaned from the in-line detectors may be transmitted via wired or wireless communications to a processor, computer, server, or other computing device (including mobile devices) where the information can be reviewed, tracked, analyzed, etc.

These rare earth particles can be tailored to have several unique optical codes that can be easily differentiated from the other via spectroscopic analysis using appropriate detection platforms. This allows for multiple well sites to be independently evaluated, identifying any cross-talk between drill sites.

An in-line detection platform for monitoring and confirmation of completion of rare earth particle linkage to the sand grains may utilize NIR excitation sources and detection components which can consist of Photomultiplier Tubes (PMTs), Avalanche photodiodes, or other hyperspectral imaging cameras.

Figure 4A:
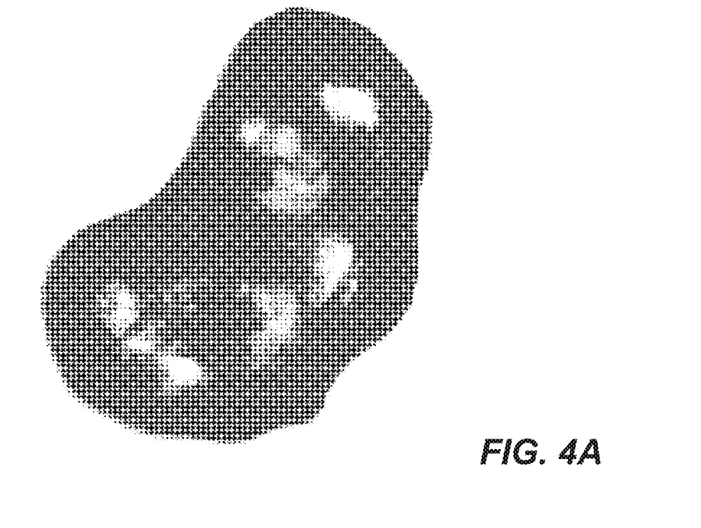
FIGS. 4A-4D are images of a tagged proppant under various light conditions, including Brightfield (FIG. 4A), Upconverted Taggant Emission only (FIG. 4B), Overlay of Brightfield (FIG. 4C) and Overlay of Upconversion Emission (FIG. 4D).
Figure 4B:
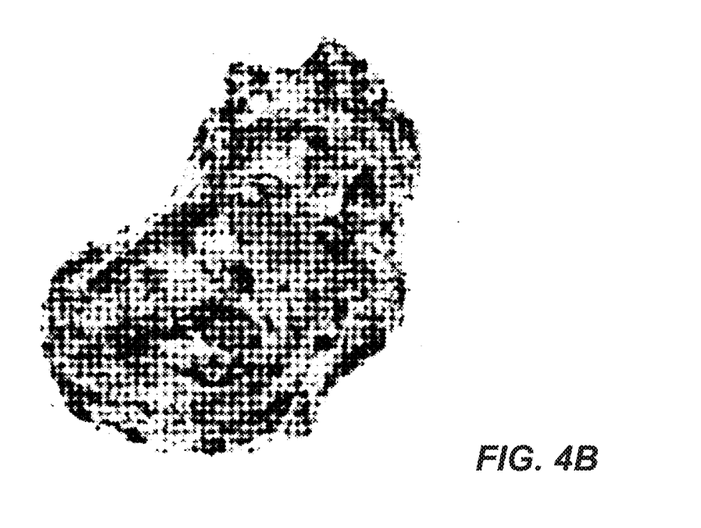
Figure 4C:
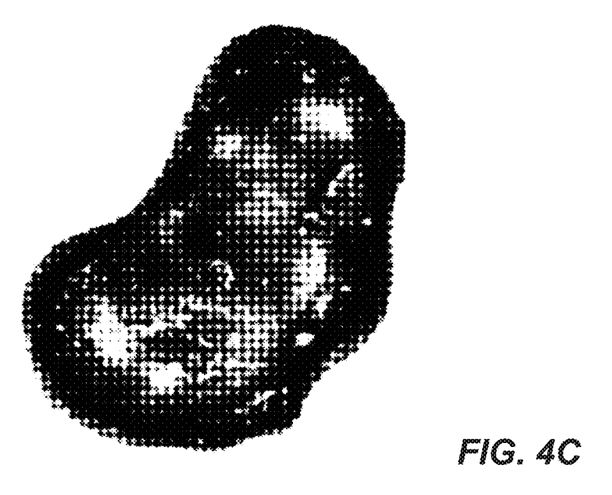
Figure 4D:
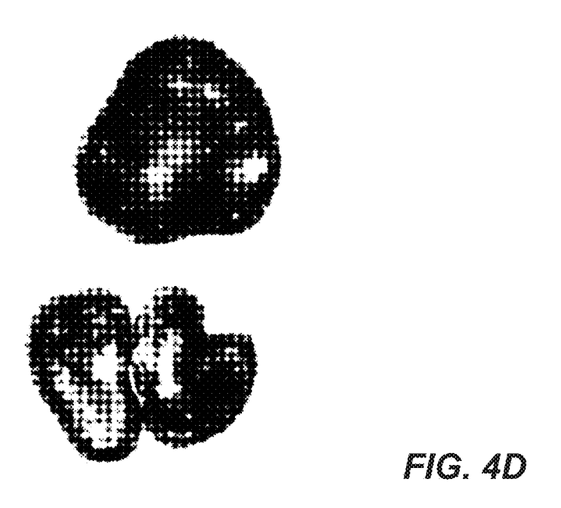

The tagged proppant can also be imaged using standard microscopic techniques and components based on the desired wavelengths. FIGS. 4A-4D show the acquired images of a tagged proppant under various light conditions: Brightfield (FIG. 4A), Upconverted Taggant Emission Only (FIG. 4B), and Overlay of Brightfield (FIG. 4C) and Upconversion Emission (FIG. 4D).

The in-line detection platforms provide accurate and real-time quantification of the rare earth particles' optical signal which is then correlated to quantity of sand being tagged.

Detection platforms may be paired to the specific optical codes from the rare earth particles, may be modified for a variety of detection scenarios, and may be capable of parts-per-billion detection sensitivity. In-line detection systems can monitor initial rare earth particle loading concentrations onto the tagged portion of the proppant sand as well as when the tagged sand is blended into the non-labeled portion of the proppant mixtures.

In some embodiments, the ratio-metric response of the rare earth particles can provide real-time information with regards to injection efficiency into a given well.

Further, field deployable, portable detection platforms may also be implemented for high-resolution, high sensitivity detection of the tagged sand in soil samples. Field deployable readers may be used for highly sensitive detection of core samples looking for trace quantities (<1 mg) of the rare earth particles.

In some embodiments, the portable detection platforms for rare earth particles may operate on battery power and may be ruggedized for harsh environmental conditions, including utilizing environmentally sealed housing. Both field deployable and in-line devices can be designed with various data sharing capabilities such as including via internet, WiFi, Bluetooth, standard Ethernet communication standards, and/or other wired or wireless techniques.

Thus, the disclosed method can be summarized as follows—to track or trace a material, rare earth particles are mixed with the material to be tracked or traced. For a particular subterranean formation or zone a fluid containing the rare earth particles may be pumped into the formation or zone. Fluids or other materials recovered from the formation or zone may be analyzed for the presence of one or more of the rare earth particle(s) using techniques known in the art. For example. optical and magnetic readers designed to distinguish rise time, decay time, paramagnetic properties, absorption, emission and other parameters from the phosphors, particularly the monodisperse phosphors described in U.S. Pat. No. 9,181,477 B2, which is incorporated herein in its entirety. It is known that phosphors of different morphologies or shapes produce different signals. The uniformity of these preferred phosphors allows for precise concentration reading. Thus, the use of different phosphors or different unique combinations of phosphors provides the ability to determine if the water, sand, chemicals are from a certain blender, oil field, well, cement mix, etc. This overcomes current difficulties in tracking or tracing materials and fluids to and from their origin, through their flow or from their endpoint and has many benefits and implications in environmental protection or liability, discovery efforts, determination of water flows, determination of subterranean hydrocarbon flows, etc.

The marking of other upstream products, downstream products and/or byproducts of the oil and gas industry such as motor oil and crude, are also ideal industry applications that would greatly benefit from a supply chain monitoring system.

A method similar to the method described above is used, although instead of using fracking sand in the first mixture, the upstream product, downstream product, or byproduct is introduced. Then, similar to the method described above, the first and second mixture can be combined and a covalent amide bond may be formed by allowing an amine terminated polymer in the second mixture to react with the amine-reactive coated particle in the first mixture.

In one example, a refined hydrocarbon lubricant (motor oil) was tagged using rare earth particles having diameters less than 100 nm. Various ligands can be attached to the surface of the rare earth particles taggants allowing for long-term stability in gasoline and other refined hydrocarbon products depending on the properties chemical and physical (viscosity) properties of the product being tagged. Dienes can be utilized in instances where polymerization/cross-linking is needed as in the synthesis of metal chelating compounds. Additionally, non-linear polymers such as branched or hyperbranched dendrimers can be synthesized to include many branches or generations through repetitive chemistry. The solubility of dendrimers depends primarily on the type of surface group linked to the final generation of the branched structure, i.e., hydrophobic terminal groups will provide more solubility/miscibility in non-polar solvents where hydrophilic terminal groups are soluble/miscible in polar solvents. Examples of ligands used in this manner include: myristic acid, oleic acid, oleylamine, among others.

Figure 5:
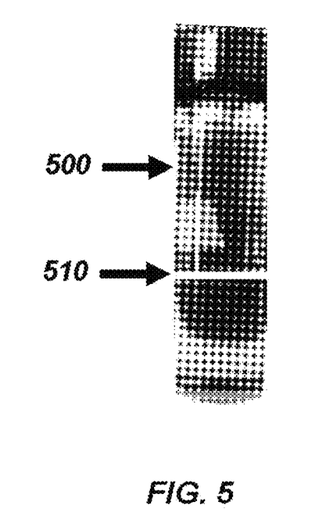
FIG. 5 is an image of oleic acid-coated $NaYF_4$:Yb,Er nanoparticles suspended in 10 W-30 motor oil at 10 mg/1000 mL concentration.

One example product was produced by combining 10 mg oleic acid coated $NaYF_4$:Yb(0.2),Er(0.02), 20 nm nanoparticles and dispersing into 1 L of 10 W-30 motor oil. The oleic acid ligand is chosen in this instance due to its stability and miscibility in motor oil, shown in FIG. 5. As seen in FIG. 5, the suspension (500) is a non-cloudy mixture, and when a laser beam at an appropriate wavelength illuminates the glass container containing the suspension, a solid line (510) of emitting particles can be seen, regardless of where in the containing the beam is aimed, indicating the particles are suspended throughout the container. The oleic acid ligands are bound to the surface of the nanoparticles via strong ionic interactions between the terminal —OH groups of oleic acid and the surface rare earth atoms. The oleic acid is coated onto the surface via a variety of methods including in situ during the synthesis of the nanoparticles.

Other examples of ligand attachment include the dispersing of approximately 100 mg of $NaYF_4$:Yb,Er nanoparticles in a 5:1 hexane/oleic acid mixture at a total volume of 25 mL. The solution was stirred overnight at 60° C. ensuring coupling of the oleic acid to the nanoparticle surface. The particles were precipitated with ethanol and separated by centrifugation (e.g., at 8000 rpm for 3 min). The resultant product could then be readily suspended in standard 10W-30 motor oil by simple sonication and vortexing techniques.

The percent loading concentration will be primarily determined by the sensitivity of available detection platforms. Ideally, concentrations of less than 1% are used for authentication and supply chain tracking of product.

Thus, specific compositions and methods utilizing rare earth particles to tag proppant sand or other materials related to the hydraulic fracturing process have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. In addition, the references listed herein are also part of the application and are incorporated by reference in their entirety as if fully set forth herein.

What is claimed is:

1. A composition of matter comprising a linker polymer conjugated to a rare earth particle,
    wherein the linker polymer is a naphthalene-based polymer, myristic acid, or a hydrocarbon resin.

2. A mixture comprising a composition of matter according to claim 1 suspended in a refined hydrocarbon, where the composition of matter according to claim 1 has formed a covalent amide bond to at least one amine terminated polymer.

3. A mixture comprising:
    a proppant sand particle; and
    a composition of matter according to claim 1;
    wherein the proppant sand particle is coated with the composition of matter.

* * * * *